(12) United States Patent
Hua et al.

(10) Patent No.: US 9,882,733 B2
(45) Date of Patent: Jan. 30, 2018

(54) MIGRATING EMBMS INTO A CLOUD COMPUTING SYSTEM

(71) Applicant: TELEFONAKTIEBOLAGET L M ERICSSON (PUBL), Stockholm (SE)

(72) Inventors: Xufan Hua, Shanghai (CN); Jiangtao Zhang, San Jose, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 62 days.

(21) Appl. No.: 14/897,580

(22) PCT Filed: Jun. 14, 2013

(86) PCT No.: PCT/CN2013/077073
§ 371 (c)(1),
(2) Date: Dec. 10, 2015

(87) PCT Pub. No.: WO2014/198020
PCT Pub. Date: Dec. 18, 2014

(65) Prior Publication Data
US 2016/0119157 A1    Apr. 28, 2016

(51) Int. Cl.
*H04L 29/12* (2006.01)
*H04L 12/18* (2006.01)
(Continued)

(52) U.S. Cl.
CPC ........... *H04L 12/189* (2013.01); *H04L 49/35* (2013.01); *H04L 61/2069* (2013.01);
(Continued)

(58) Field of Classification Search
CPC .................................................. H04L 12/189
See application file for complete search history.

(56) References Cited

U.S. PATENT DOCUMENTS

| 8,930,552 B2 | 1/2015 | Ueno | |
|---|---|---|---|
| 2010/0027541 A1* | 2/2010 | Eriksson | H04W 72/005 370/390 |

(Continued)

FOREIGN PATENT DOCUMENTS

| CN | 102057699 A | 5/2011 |
|---|---|---|
| CN | 102308534 A | 1/2012 |
| CN | 102668467 A | 9/2012 |
| WO | 2012160465 A1 | 11/2012 |

OTHER PUBLICATIONS

International Search Report dated Mar. 20, 2014, in International Application No. PCT/CN2013/077073, 3 pages.
(Continued)

*Primary Examiner* — John Blanton
(74) *Attorney, Agent, or Firm* — Rothwell, Figg, Ernst & Manbeck, P.C.

(57) ABSTRACT

A method is executed by a multimedia broadcast multicast services gateway (MBMS-GW) to offload data plane traffic, where the data plane traffic is enhanced MBMS (e MBMS) downlink traffic for a data plane interface Internet Protocol (IP) multicast transport between the MBMS-GW and an enhanced node B (e Node B). The method includes allocating an IP multicast address and a common tunnel endpoint identifier (C-TEID) for an MBMS session between node B (e Node B) and a broadcast multicast service center (BM-SC). The method also includes configuring the at least one network element to match an IP address and a user datagram protocol (UDP) port of incoming data plane traffic, to modify the IP address and UDP port to the IP multicast address and associated UDP port, and to push a general packed radio service (GPRS) tunneling protocol (GTP) user data (GTP-U) header including the C-TEID onto the data plane traffic.

18 Claims, 12 Drawing Sheets

(51) Int. Cl.

| | |
|---|---|
| *H04W 76/00* | (2009.01) |
| *H04W 76/02* | (2009.01) |
| *H04L 12/931* | (2013.01) |
| *H04L 29/06* | (2006.01) |
| *H04L 29/08* | (2006.01) |

(52) U.S. Cl.
CPC ...... *H04L 61/2503* (2013.01); *H04L 65/1069* (2013.01); *H04L 67/10* (2013.01); *H04L 69/16* (2013.01); *H04W 76/002* (2013.01); *H04W 76/021* (2013.01)

(56) References Cited

U.S. PATENT DOCUMENTS

| | | | |
|---|---|---|---|
| 2011/0085489 | A1 | 4/2011 | Rydnell et al. |
| 2012/0257529 | A1 | 10/2012 | Ehara et al. |
| 2013/0054761 | A1* | 2/2013 | Kempf ............... H04L 12/4633 709/220 |
| 2015/0023176 | A1* | 1/2015 | Korja ..................... H04L 45/42 370/236 |
| 2015/0230063 | A1* | 8/2015 | Chandramouli ...... H04W 4/005 455/466 |
| 2015/0244570 | A1* | 8/2015 | Wang ................ H04L 41/0803 709/220 |
| 2016/0330113 | A1* | 11/2016 | Chiba .................... H04L 45/38 |

OTHER PUBLICATIONS

3GPP, 3rd Generation Partnership Project; Technical Specification Group Radio Access Network; Evolved Universal Terrestrial Radio Access Network (E-UTRAN); M1 data transport, (Release 11), 3GPP TS 36.445 V11.0.0, 2012, 8 pages.

3GPP, 3rd Generation Partnership Project; Technical Specification Group Radio Access Network; Evolved Universal Terrestrial Radio Access Network (E-UTRAN); M3 Application Protocol (M3AP), (Release 11), 3GPP TS 36.444 V11.5.0, 2013, 63 pages.

3GPP, 3rd Generation Partnership Project; Technical Specification Group Core Network and Terminals; General Packet Radio System (GPRS) Tunnelling Protocol User Plane (GTPv1-U), (Release 11), 3GPP TS 29.281 V11.6.0, 2013, 27 pages.

3GPP, 3rd Generation Partnership Project; Technical Specification Group Core Network and Terminals; 3GPP Evolved Packet System (EPS); Evolved General Packet Radio System (GPRS) Tunnelling Protocol for Control plane (GTPv2-C); Stage 3, (Release 12), 3GPP TS 29.274 V12.0.0, 2013, 228 pages.

3GPP, 3rd Generation Partnership Project; Technical Specification Group Core Network and Terminals; Interworking between the Public Land Mobile Network (PLMN) supporting packet based services and Packet Data Networks (PDN), (Release 12), 3GPP TS 29.061 V12.1.0, 2013, 163 pages.

OpenFlow Switch Specification, Version 1.1.0 Implemented (Wire Protocol 0x02), 2011, 56 pages.

* cited by examiner

MIGRATING EMBMS INTO A CLOUD COMPUTING SYSTEM

CROSS REFERENCE TO RELATED APPLICATION(S)

This application is a 35 U.S.C. §371 National Phase Entry Application from PCT/CN2013/077073, filed Jun. 14, 2013, designating the United States, the disclosure of which is incorporated herein in its entirety by reference.

FIELD OF THE INVENTION

The embodiments of the invention relate to a method and system for separating a control plane and data plane of an enhanced multimedia broadcast and multicast service (eMBMS) in an evolved packet core (EPC) in a cloud computing system. Specifically, the embodiments of the invention relate to the use of a split architecture framework to offload the processing of the eMBMS data plane from the MBMS gateway (MBMS-GW) to set of network elements that implement the eMBMS data plane.

BACKGROUND

The general packet radios system (GPRS) is a system that is used for transmitting Internet Protocol packets between user devices such as cellular phones and the Internet. The GPRS system includes the GPRS core network, which is an integrated part of the global system for mobile communication (GSM). These systems are widely utilized by cellular phone network providers to enable cellular phone services over large areas.

Multimedia Broadcast and Multicast Services (MBMS) is a broadcasting service offered via cellular phone networks. Enhanced MBMS (eMBMS) is used to denominate MBMS service in an evolved packet core system including enhanced universal terrestrial radio access network (E-UTRAN) (i.e., long term evolution (LTE)) and UTRAN access.

eMBMS is specified by 3rd generation partnership project (3GPP) and gives the opportunity to broadcast television (TV) and film programming, information such as free overnight transmissions of newspapers in a digital form or file download in these cellular phone service networks. The most prominent application is Mobile TV. However, eMBMS may also be used to off-load unicast by pre-loading of popular content such as YouTube, "Top 10" or CNN pages containing breaking news.

The broadcast capability of eMBMS enables it to reach a large number of users with constant network load. Further, eMBMS also enables the possibility to broadcast information simultaneously to a large number of cellular subscribers, for example, eMBMS can be used to distribute emergency alerts. However, eMBMS can place a heavy load on the network elements that implement the protocol. In particular, the eMBMS-GW can carry a heavy load. In situations where a split-architecture is implemented in the evolved packet core (EPC), the eMBMS traffic traverses network nodes such as smart service router (SSR) nodes, which is not a scalable solution for the increase in eMBMS traffic. The network nodes can include multiple router boards or line cards to do external and internal switching, and processing boards to handle both signaling and traffic processing

SUMMARY

A method is executed by a network element implementing a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB). The method includes allocating an IP multicast address and a common tunnel endpoint identifier (C-TEID) for an MBMS session between node B (eNodeB) and a broadcast multicast service center (BM-SC). The method also includes configuring the at least one network element to match an IP address and a user datagram protocol (UDP) port of incoming data plane traffic, to modify the IP address and UDP port to the IP multicast address and associated UDP port, and to push a general packed radio service (GPRS) tunneling protocol (GTP) user data (GTP-U) header including the C-TEID for the MBMS session onto the data plane traffic.

A network element is disclosed that implements a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB). The network element comprises an ingress module configured to receive the data traffic, an egress module configured to transmit the data traffic, and a computing processor configured to execute an MBMS module and an MBMS controller module. The MBMS module is configured to allocate an IP multicast address and a control tunnel endpoint identifier (C-TEID) for an MBMS session between node B (eNodeB) and a broadcast multicast service center (BM-SC). The MBMS controller module is configured to configure the at least one network element to match an IP address and a user datagram protocol (UDP) port of incoming data plane traffic, to modify the IP address to the IP multicast address and associated UDP port, and to push a general packed radio service (GPRS) tunneling protocol (GTP) user data (GTP-U) header including the C-TEID onto the data plane traffic.

A method is described that is executed by a network element implementing a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB). The method includes receiving an MBMS session stop request message from a broadcast multicast service center (BM-SC). An MBMS session stop response message is sent to the BM-SC. The at least one network element is configured to delete a flow table entry matching an IP address and a user datagram protocol (UDP) port of incoming data plane traffic using the flow control protocol.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
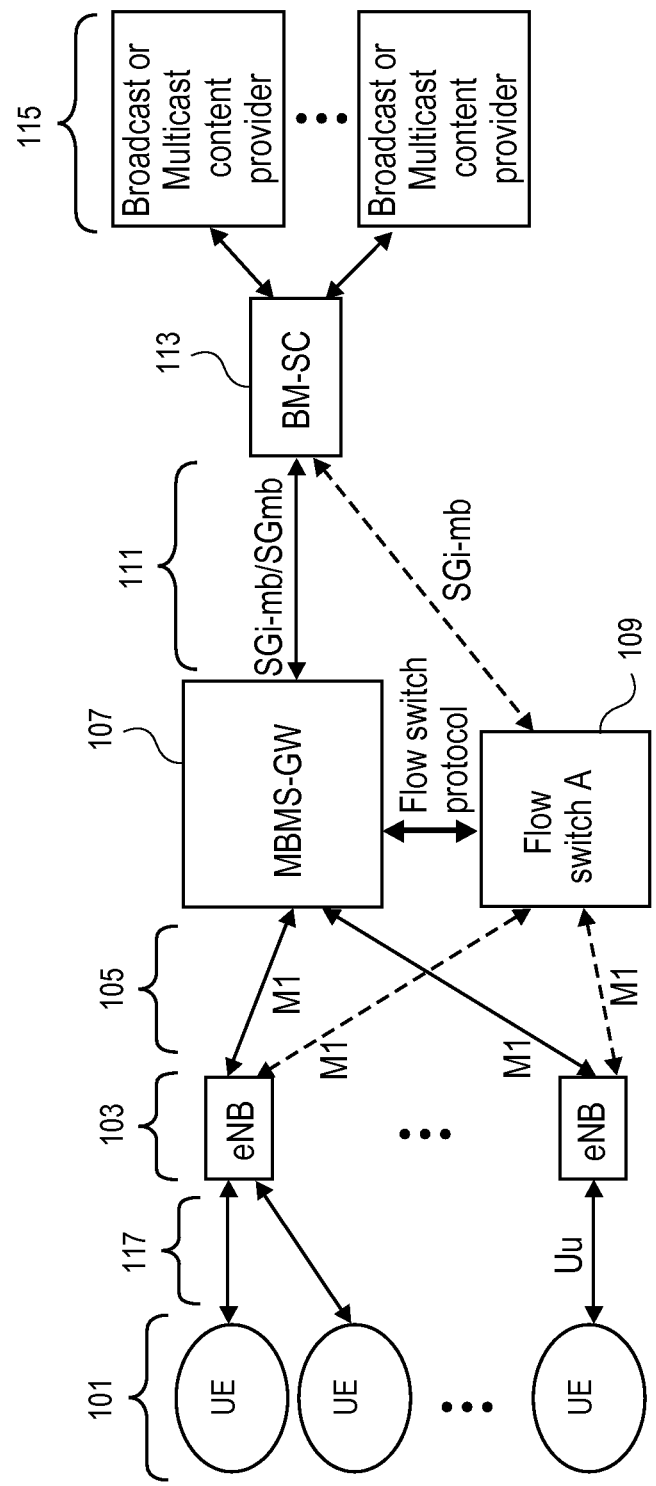
FIG. 1 is a diagram of a network where MBMS is utilized to distribute multimedia services to a set of eNodeBs in an evolved packet core (EPC) network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow charts will be described with reference to the exemplary embodiments in the diagrams of the figures. However, it should be understood that the operations of the flow charts can be performed by embodiments of the invention other than those discussed with reference to the diagrams of the figures, and the diagrams discussed with reference to the figures can perform operations different than those discussed with reference to the flow charts of the figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that prior implementations of the evolved packet core have a high traffic load passing through the multimedia broadcast and multicast services gateway (MBMS-GW) in the network. Even where other control plane functionality has been offloaded to a cloud computing system all the MBMS packets continue to go to the network nodes such as for example a smart service router (SSR) or similar network nodes in the network. The network node can include multiple router boards or line cards to do external and internal switching, and processing boards to handle both signaling and traffic processing. However, this configuration is not, in fact, scalable and increases latency and reduces throughput of MBMS sessions. Existing MBMS-GW payload handling methods are not flexible or performance oriented. When payload size and volumes of MBMS sessions traffic increase beyond a certain threshold level in the network, the processing boards of the MBMS-GW will be overloaded. This is the limit of the network devices implementing MBMS-GWs.

The embodiments of the invention discussed herein overcome these disadvantages of the prior art by using a set of flow switches to offload MBMS data plane traffic handled by the MBMS-GW between SGi-mb interface and M1 interface. Flow switches are configured to forward packets with matching Internet Protocol (IP)/user datagram protocol (UDP) header information using flow tables. These flow tables are configured by the control plane of the MBMS-GW, which can be implemented by a network device in the network or in a cloud computing system. The cloud computing system or in place MBMS-GW will act as flow controller for the set of flow switches. In one embodiment, the flow switches are implemented as OpenFlow switches and the MBMS-GW as an OpenFlow controller.

EPC Architecture and Enhanced EPC Architecture

U.S. patent application Ser. No. 13/113,727 (Publication Number US20120303835), incorporated herein by reference, describes implementing the control plane of an EPC in a cloud computing facility and the data plane of the EPC using a set of OpenFlow switches, as well as managing communication between the control plane and the dataplane using the OpenFlow protocol (e.g., OpenFlow 1.1). The application solves a problem that the OpenFlow protocol did not support GTP or GTP tunnel endpoint identifier (TEID) routing, which is necessary for implementing the data plane of the EPC.

The OpenFlow protocol is extended and used to connect the data plane and control plane of the EPC, with enhancements to support GTP routing. While the EPC architecture already has a split between the control plane and the data plane, in the sense that the serving gateway (S-GW) and the PDN gateway (P-GW) are data plane entities while the mobility management entity (MME), the policy and charges rule function (PCRF), and home subscriber server (HSS) are control plane entities, this split was made at the level of the mobility management protocol, GTP.

The standard EPC architecture assumes a standard routed IP network for transport on top of which the mobile network entities and protocols are implemented. The enhanced EPC architecture described in U.S. patent application Ser. No. 13/113,727 (Publication Number US20120303835) is instead at the level of IP routing and media access control (MAC) switching. Instead of using L2 routing and L3 internal gateway protocols to distribute IP routing and managing Ethernet and IP routing as a collection of distributed control entities, L2 and L3 routing management is centralized in a cloud facility and the routing is controlled from the cloud facility using the OpenFlow protocol. As used herein, the "OpenFlow protocol" refers to the OpenFlow network protocol and switching specification defined in the OpenFlow Switch Specification at www.openflowswitch.org a web site hosted by Stanford University. As used herein, an "OpenFlow switch" refers to a network element implementing the OpenFlow protocol. However, the embodiments of the present invention are also compatible with other flow switch implementations and protocols other than OpenFlow, which is provided herein as an example and not by limitation.

In the enhanced EPC architecture of U.S. patent application Ser. No. 13/113,727 (Publication Number US20120303835), the standard EPC control plane entities— the MME, PCRF, and HSS—are likewise deployed in the cloud, along with the control plane parts of the serving gateway (S-GW) and packet data network (PDN) gateway (P-GW), namely, the S-GW-C and the P-GW-C. The data plane consists of standard OpenFlow switches with enhancements as needed for routing GTP packets, rather than IP routers and Ethernet switches. At a minimum, the data plane parts of the S-GW and P-GW, namely, the S-GW-D and the P-GW-D, and the packet routing part of the eNodeB in the enhanced universal terrestrial radio access network (E-UTRAN) require OpenFlow enhancements for GTP routing. Additional enhancements for GTP routing may be needed on other switches within the EPC architecture depending on how much fine grained control over the routing an operator requires.

The split between the control and data plane parts of the EPC can be used together with virtual private cloud (VPC) technology to implement multiple points of presence (PoPs) within a single EPC, provide GTP flow-specific routing for specialized applications, and run multiple operator networks from a single cloud computing facility.

In one embodiment, the cloud based EPC system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the non-transitory computer-readable medium include a read only memory (ROM), a floppy diskette, a CD Rom, a DVD, a flash memory, a hard drive, an optical disc or similar medium.

The cloud based EPC system as described in U.S. patent application Ser. No. 13/113,727 (Publication Number US20120303835) is provided by way of example as an environment in which the present invention may be utilized. However, one skilled in the art would understand that the embodiments can be implemented without other components of the EPC being implemented in a cloud computing system and as mentioned above with the use of any flow switch protocol, rather than OpenFlow.

Flow Switch Networks

Flow switch protocols enable a flow controller to connect to a set of flow switches using a secure channel and to control at least one forwarding table in the switch. The flow controller is an external software component executed by a remote computing device that enables a user to configure the flow switches. The secure channel can be provided by any type of network including a local area network (LAN) or a wide area network (WAN), such as the Internet. Each flow switch implements a set of flow tables that can be configured by the flow controller to determine how data plane traffic is handled. These flow tables define a set of actions to be taken on a packet by packet basis for each packet matching the characteristics (e.g., header information such as destination address or port address) defined in a flow table entry. The configuration and use of flow switches is described further herein below as it applies to the configuring of switches to handle MBMS session traffic.

GTP

The GPRS tunneling protocol (GTP) is an important communication protocol utilized within the EPC network. GTP enables end user devices (e.g., cellular phones) in a global system for mobile communication (GSM) network to move from place to place while continuing to connect to the Internet. The end user devices are connected to other devices through a gateway GPRS support node (GGSN). The GGSN tracks the end user device's data from the end user device's serving GPRS support node (GGSN) that is handling the session originating from the end user device.

Three forms of GTP are used by the EPC network. GTP-U is used for transfer of user data in separated tunnels for each packet data protocol (PDP) context. GTP-C is used for control including setup and deletion of PDP contexts, verification of GGSN and SGSN reachability, and updates. When end user devices move from one GGSN to another GTP-C is used to affect this transfer. GTP' is used for the transfer of charging data from GSM to the charging gateway function (CGF), which provides requisite end user device usage information to a billing system.

Multimedia Broadcast Multicast Service

Multimedia Broadcast and Multicast Services (MBMS) is a broadcasting service offered via cellular networks. Enhanced MBMS (eMBMS) is used to denominate MBMS service in an evolved packet core (EPC) network including E-UTRAN (LTE) and UTRAN access. MBMS is used herein as a general term to refer to both standard MBMS (i.e., non-EPC based MBMS) and eMBMS (i.e., MBMS in an EPC). The examples are primarily related to the EPC network and MBMS is conventionally referred to as eMBMS in this context.

MBMS is specified by 3rd generation partnership program (3GPP) and gives the opportunity to broadcast TV, film, and similar audio and video formatted data and information such as free overnight transmissions of newspapers in a digital form or file download in these networks. The most prominent application is Mobile TV. However, MBMS may also be used to off-load unicast by pre-loading of popular multi-media content such as video streaming sites and pages.

The broadcast capability of MBMS enables multimedia services to reach unlimited number of users with a constant network load. Further, it also enables the possibility to broadcast other information simultaneously to many cellular subscribers, such as emergency alerts.

FIG. 1 is a diagram of a network where MBMS is utilized to distribute multimedia services to a set of eNodeBs ('eNB' also known as base stations) in an EPC. This is a simplified representation of the network for sake of clarity in describing the use of MBMS and specifically the role of the MBMS-GW. MBMS is broadcast and multicast service designed to enable multiple end user equipment (UE) 101 to receive the same data without redundant communication of the data over the entire network.

The multicast or broadcast data originates from a set of broadcast or multicast content providers 115 that are external to the EPC network. These content providers 115 can be located anywhere that is in communication with the EPC network. A broadcast multicast service center (BM-SC) 113 is the component that interfaces with the content providers 115 and generates the MBMS sessions that transmit the broadcast data and multicast data from the BM-SC 113 to the eNodeBs (eNBs) 103 over the EPC. The BM-SC 113 is responsible for authorizing the requests to subscribe to MBMS (i.e., multicast and broadcast) services and the scheduling and management of the MBMS sessions.

The MBMS-GW 107 is the entry point of the broadcast and multicast traffic to the EPC network. The MBMS-GW 107 transmits the MBMS session data to each of the eNodeBs 103 within an EPC. The MBMS-GW 107 manages MBMS sessions over the SGi-mb 111 and the M1 105 interfaces. In some embodiments, the eNodeBs 103 include a multi-cell/multicast coordination entity (MCE). In other embodiments, the MCE is separate from the eNodeBs 103 and communicates over interface M2. The MCE is a logical entity responsible for allocation of time and frequency resources for multi-cell MBMS transmission. The MCE performs the scheduling on the radio interface between the eNodeBs 103 and the user equipment 101. The MCE can handle the admission control for MBMS Sessions and allocation of radio resources commonly used by all eNodeBs 103 and as well as MBMS Single Frequency Network transmission. The eNodeBs 103 provides further functionality for broadcasting MBMS user data and MBMS related control signaling on the Uu interface 117.

In one embodiment, the MBMS-GW 107 uses IP Multicast as the means of forwarding MBMS user data to the eNodeBs 103. The MBMS-GW 107 performs MBMS session control signaling (session start/stop) towards the E-UTRAN via an MME (not shown). The MME provides session control of MBMS bearers to the E-UTRAN access.

The SGmb interface 111 is used for controlling the establishment and release of the MBMS bearers. The SGi-mb interface 111 is a data plane interface for eMBMS traffic (downlink only) and is specified in TS 29.061. The Sm interface (not shown) (between the MME and the MBMS-GW) is a control plane interface, which is based on GTPv2-C and is defined in TS 29.274. The M1 interface 105 is a data plane interface, which is based on GTPv1-U. As mentioned, IP Multicast is used as a transport between MBMS-GW 107 and eNodeB 103. The M3 interface (between the MME and eNodeB 103) is a control plane interface, which is based on stream control transmission protocol SCTP. The M3-AP is used on top of SCTP as defined in TS 36.444.

Figure 2:
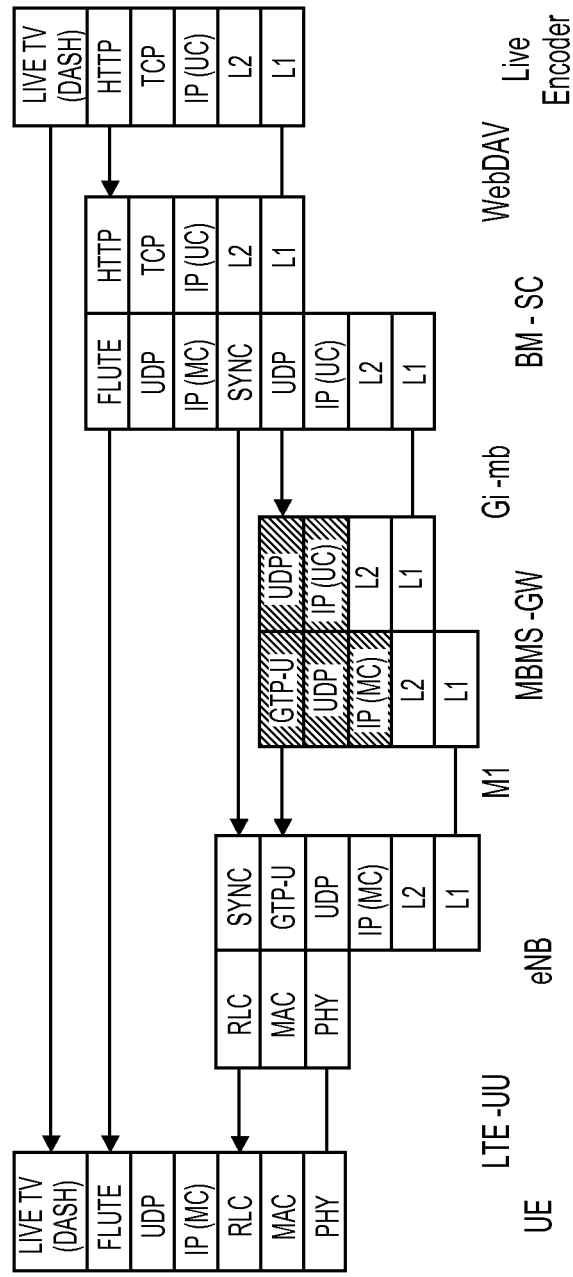
FIG. 2 is a diagram of one embodiment of the user data plane as it traverses the EPC for MBMS sessions.

FIG. 2 is a diagram of one embodiment of the user data plane as it traverses the EPC for MBMS sessions. The illustrated example shows the communication of live TV using dynamic adaptive streaming over HTTP (DASH). The data is further encapsulated with header information for HTTP, transmission control protocol (TCP), IP and L2 and L1 information. This continues over a possible web distributed authoring and versioning (WebDAV) stage.

At the BM-SC the file deliver over unidirectional transport (FLUTE) protocol can be utilized for multicasting along with the user datagram protocol (UDP) to transport the data over the EPC via the MBMS-GW. The SGi-mb interface is over UDP between BM-SC and MBMS-GW. The MBMS-GW provides an interface for reception of MBMS data plane data through the SGi-mb (data plane) reference point as well as IP multicast distribution of MBMS data plane data to eNodeBs (M1 reference point). GTP is utilized between the MBMS-GW and ENodeBs. UDP is used as a pipe is to simplify the routing. In the diagram IP (UC) indicates unicast addresses and IP (MC) indicates multicast addresses.

MBMS-GW Architecture

Figure 3:
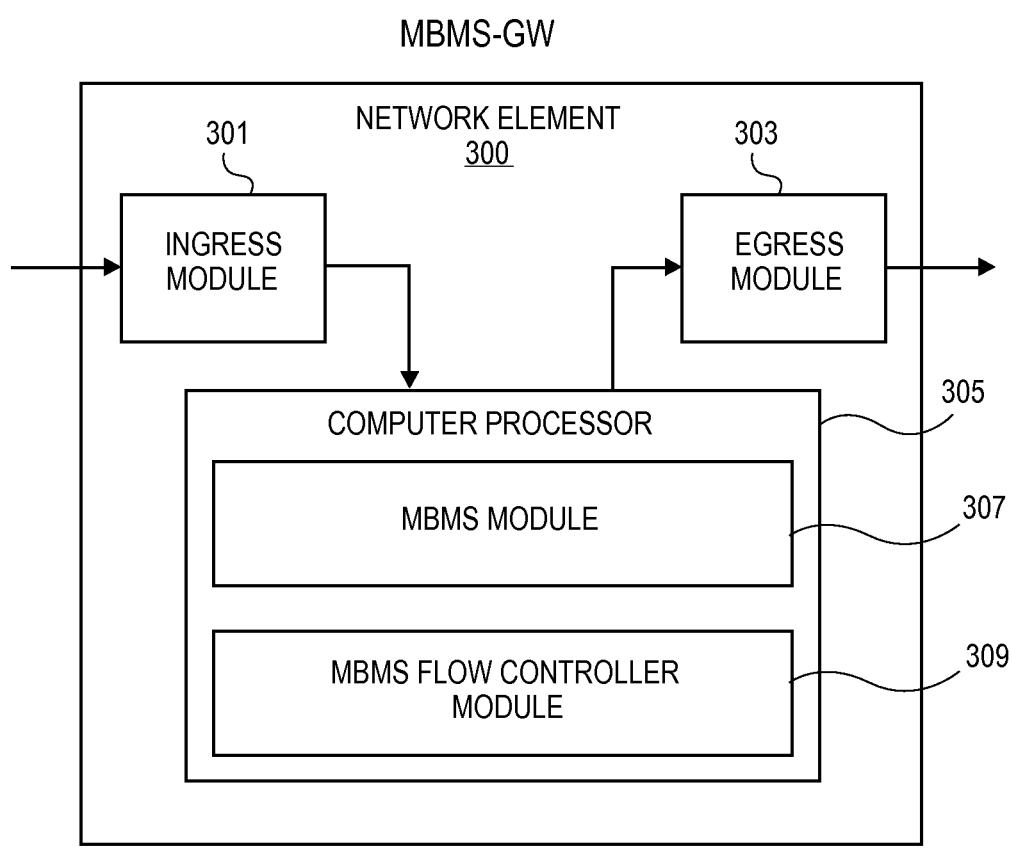
FIG. 3 is a diagram of one embodiment of a network element implementing the MBMS-GW.

FIG. 3 is a diagram of one embodiment of a network element implementing the MBMS-GW. In this embodiment, the MBMS-GW can be implemented by a network element within the EPC network. In one embodiment, the network element includes an ingress module 301, egress module 303, and a computer processor 305. The ingress module 301 handling the processing of incoming data packets. Similarly, the egress module 303 handles the transmission of outbound data packets. The ingress module 301 and egress module 303 can be implemented as line cards or similar components that service processing and forwarding of data packets. These line cards can be interconnected by an internal bus, switch fabric or similar interconnect.

In one embodiment, the network element 300 implements the control plane of the MBMS-GW. The control plane can be implemented in an MBMS module 307 and an MBMS flow controller module 309. The MBMS module 307 can implement the general control functions for MBMS in the control plane of the MBMS-GW. The MBMS module 307 can work in conjunction with the MBMS flow controller module 309 to manage and configure the data plane of the MBMS-GW. The MBMS flow controller module 309 can use any flow control protocol to communicate with and configure the function of the flow switches that implement the data plane of the MBMS-GW. The functions of the MBMS controller module 309 are described further herein with reference to the timing and flow diagrams of FIGS. 7-12.

EPC Network in a Cloud Computing System

Figure 4:
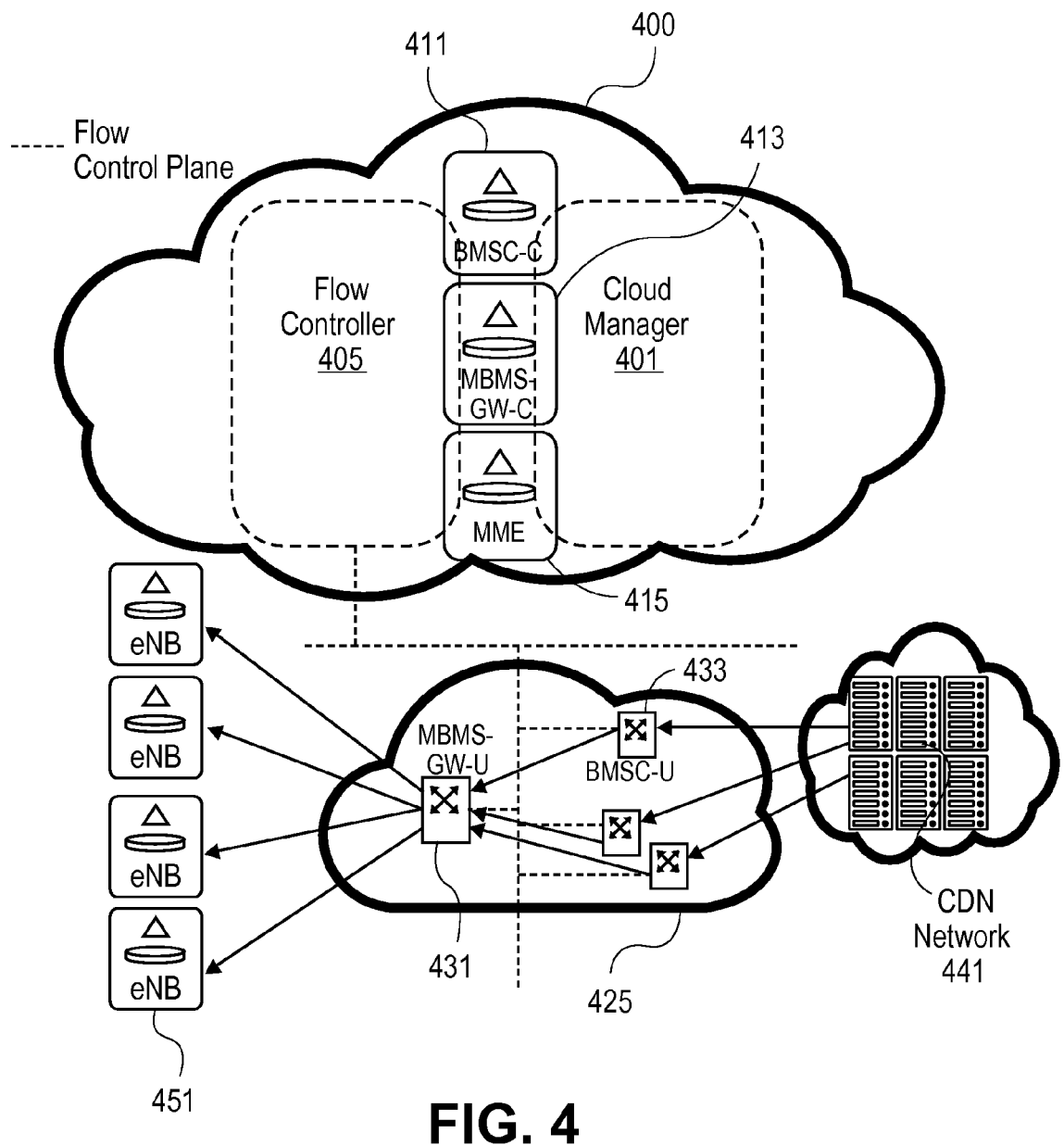
FIG. 4 is a diagram of an example implementation where the MBMS-GW control plane (MBMS-GW-C) is implemented in a cloud computing system.

FIG. 4 is a diagram of an example implementation where the MBMS-GW control plane (MBMS-GW-C) is implemented in a cloud computing system. Data centers offer computing, storage, and network communication resources to outside customers. The offered services can consist of elastic, on demand processing, storage that for most practical purposes is limited only by the customer's ability to pay, and network bandwidth into the Internet. This set of services provided by a data center is referred to herein as cloud computing. A system implementing cloud computing is referred to herein as a cloud computing system 400.

Server virtualization technology allows a pool of servers to be managed as essentially one large computer resource. A layer of software called a hypervisor sits between the operating system and the hardware. The hypervisor schedules the execution of virtual machines (VMs). A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. A cloud manager 401 oversees the execution of VMs, the scheduling of execution to meet the demand of the VMs and the optimization of server utilization and minimization of power consumption. The cloud manager or cloud operating system is a software program that can schedule execution to allow an in-service upgrade of hardware and software without impacting ongoing service provisioning to the VMs and their applications in the cloud computing system.

To support the arbitrary movement of VMs between machines, the networking within the data center must also be virtualized. Cloud computing systems can virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby co-operate to allow VMs to be moved between servers. When the hypervisor moves a VM, it communicates with the virtual switch about the new location, and the virtual switch ensures that the network routing tables for the VM's addresses (L2 MAC address, potentially also the IP address) are updated so packets are routed to the new location.

A cloud computing system can be composed of any number of computing devices having any range of capabilities (e.g., processing power or storage capacity). The cloud computing system can be a private or public system. The computing devices can be in communication with one another across any communication system or network. A cloud computing system can support a single cloud or service or any number of discrete clouds or services. Services, applications and similar programs can be virtualized or executed as standard code. In one embodiment, cloud computing systems can support web services applications. Web services applications consist of a load balancing front end that dispatches requests to a pool of Web servers. The requests originate from applications on remote machines on the Internet and therefore the security and privacy requirements are much looser than for applications in a private corporate network.

Cloud computing systems can also support secure multi-tenancy, in which the cloud computing system provider offers virtual private network (VPN)-like connections between the client's distributed office networks outside the cloud and a VPN within the cloud computing system. This allows the client's applications within the cloud computing system to operate in a network environment that resembles a corporate WAN. For private data centers, in which services are only offered to customers within the corporation owning the data center, the security and privacy requirements for multi-tenancy are relaxed. But for public data centers, the cloud operator must ensure that the traffic from multiple tenants is isolated and there is no possibility for traffic from one client to reach another client network.

In the illustrated example, the EPC control plane entities related to MBMS are shown (BMSC-C 411, MBMS-GW-C 413, and MME 415) as part of the cloud computing system 400. A flow controller 405 provides a set of processes for the control plane entities to communicate with and configure the data plane entities shown in the EPC data plane 425. The control plane entities and the flow controller 405 can be packaged as VMs. An application programming interface (API) between the flow controller 425 and the control plane entities can be a remote procedure call (RPC) interface or similar interface. This implementation technology is favorable for scalable management of the control plane entities within the cloud computing system, since it allows execution of the control plane entities and the flow controller 405 to be managed separately according to demand. The cloud manager 401 can be a VM or an application executed within the cloud computing system 400.

The cloud manager 401 monitors the central processor unit (CPU) utilization of the EPC control plane entities and the control plane traffic between the EPC control plane entities within the cloud computing system. It also monitors the control plane traffic between the end user devices (UEs) and E-NodeBs, which do not have control plane entities in the cloud computing system 400, and the EPC control plane entities. The cloud manager 401 also provides reliability and failover by restarting a VM for a particular control plane entity or function if any of the EPC control plane entities should crash.

The flow control plane, shown here as a dotted line, manages the routing and switching configuration in the network. The flow control plane connects the cloud computing system 400 to the MBMS-GW-U 431, BM-SC-U 433, and other data plane components. These components can be in communication with the content delivery network (CDN) 441, which is an external network to the data plane of the EPC 425. The physical implementation of the flow control plane can be as a completely separate physical network, or it may be a virtual network running over the same physical network as the data plane, implemented with a prioritized VLAN or with an MPLS label switched path or even with a generic routing encapsulation (GRE) or other IP tunnel. The flow control plane can in principle use the same physical control plane paths as the GTP-C and other mobile network signaling. The MBMS-GW-U is a flow switch that is configurable according to the flow control protocol as described further herein below.

The eNodeBs 451 have no control plane entities in the cloud because the radio access network (RAN) signaling required between the MME 415 and the eNodeB includes radio parameters, and not just IP routing parameters. Therefore, there is no flow control plane connection between the flow controller 405 in the cloud computing system 400 and the eNodeBs 451.

MBMS-GW-U Configuration

The MBMS-GW-U is a flow switch or can be distributed over a set of flow switches within the data plane of the EPC network. As mentioned above, flow switches process data traffic using flow tables or similar mechanisms that are configured with a set of flow control entries that define matching criteria and corresponding actions to be taken.

Figure 5:
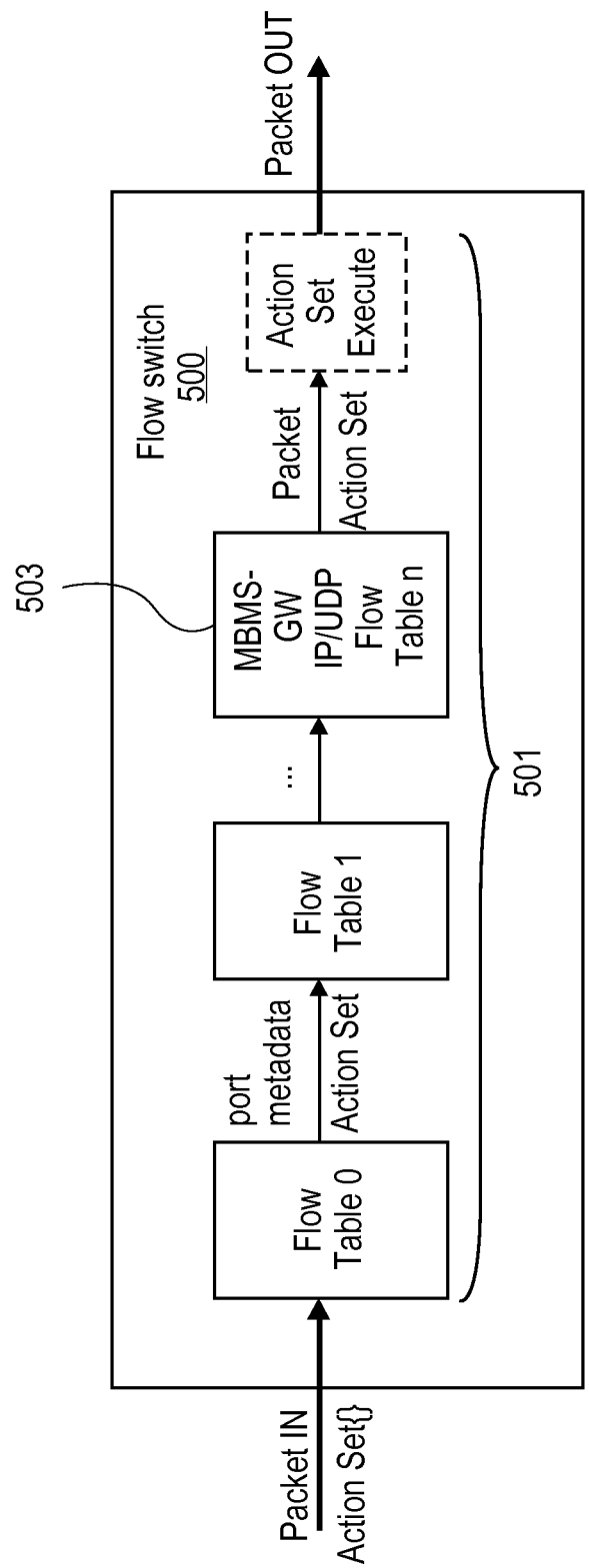
FIG. 5 is a diagram illustrating one embodiment of the contents of a flow switch.

FIG. 5 is a diagram illustrating one embodiment of the contents of a flow switch. Each flow switch 500 contains a flow pipeline 501. The flow pipeline 501 of every flow switch 500 contains multiple flow tables with sequential numbers. Each flow table contains multiple flow entries. Flow pipeline 501 processing starts at the first flow table 0 and proceeds generally sequentially forward. When pipeline processing completes, the packet will be processed with an associated action set. A flow table miss default behavior (i.e., a failure to find matching criteria in flow table entries) will send packets to the controller over control channel via packet-in message or similar protocol. In other embodiments, other default behaviors can be defined depending on table configuration such as dropping the packets or similar behavior.

Each flow table can process a different aspect of the data packet that can determine a set of actions to process the data packet and how the data packet is advanced through the flow pipeline 501. In one embodiment, a flow table is defined for MBMS-GW processing. This MBMS flow table 503 can define the additional actions and matching fields related to MBMS handling. The matching fields can include IP address and UDP ports for MBMS-GW payload forwarding that need to present before an associated action set is applied to the MBMS session traffic.

The matching field information and action set can be provided by the MBMS-GW-C via its flow controller module (e.g., where OpenFlow is the flow control protocol the OFPT_FLOW_MOD message is sent from OpenFlow Controller to the OpenFlow switch, which will modify the specific flow table entries in an OpenFlow pipeline).

Figure 6:
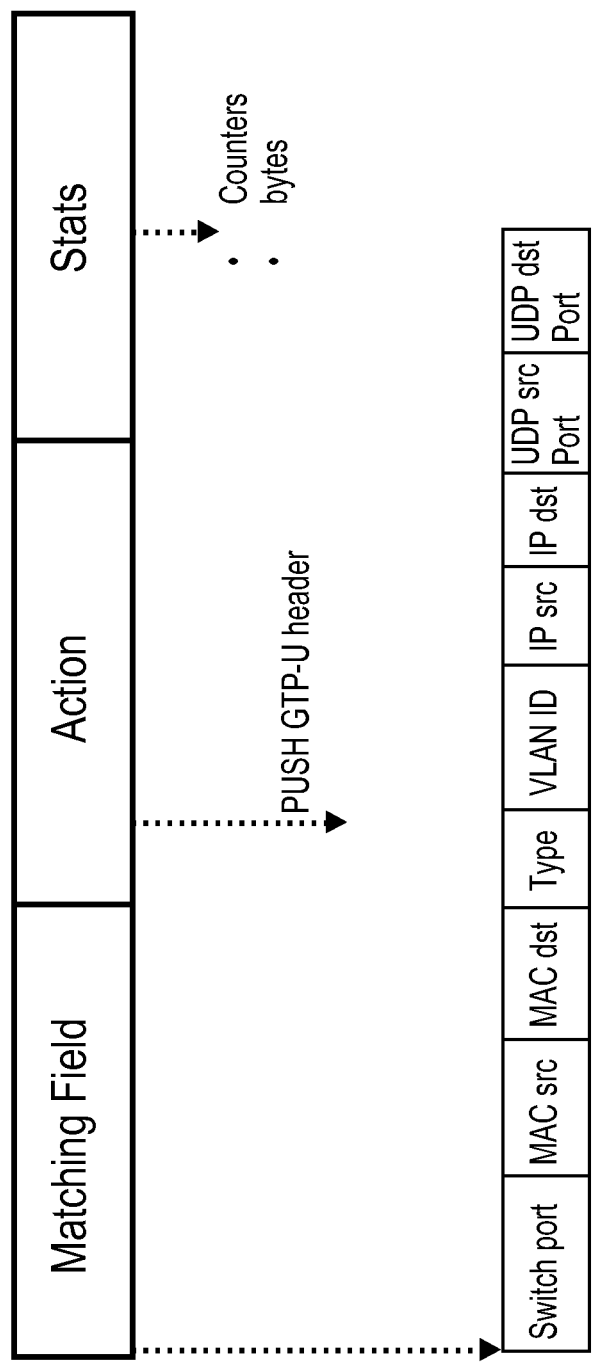

FIG. 6 is a diagram showing the structure of a flow table entry. The flow tables are populated with entries consisting of a rule defining matches for fields in packet headers ('matching fields'); an action associated with the flow match, and a collection of statistics on the flow. When an incoming packet is received a lookup for a matching rule is made in the first flow table and continues on through subsequent flow tables. If the incoming packet matches a particular rule, the associated action defined in that flow table entry is performed on the packet.

A matching rule contains key fields from several headers in the protocol stack, for example source and destination Ethernet MAC addresses, source and destination IP addresses, IP protocol type number, incoming and outgoing TCP or UDP port numbers. To define a flow, all the available matching fields may be used. But it is also possible to restrict the matching rule to a subset of the available fields by using wildcards for the unwanted fields. For MBMS-GW-U, the IP unicast address and UDP port can be included in the rule.

The actions that can be defined can include a 'drop,' which drops the matching packets, 'forward,' which forwards the packet to one or all outgoing ports, the incoming physical port itself, the controller via the secure channel, or the local networking stack (if it exists). Any type or combination of actions can be defined and associated with any matching criteria.

Figure 7:
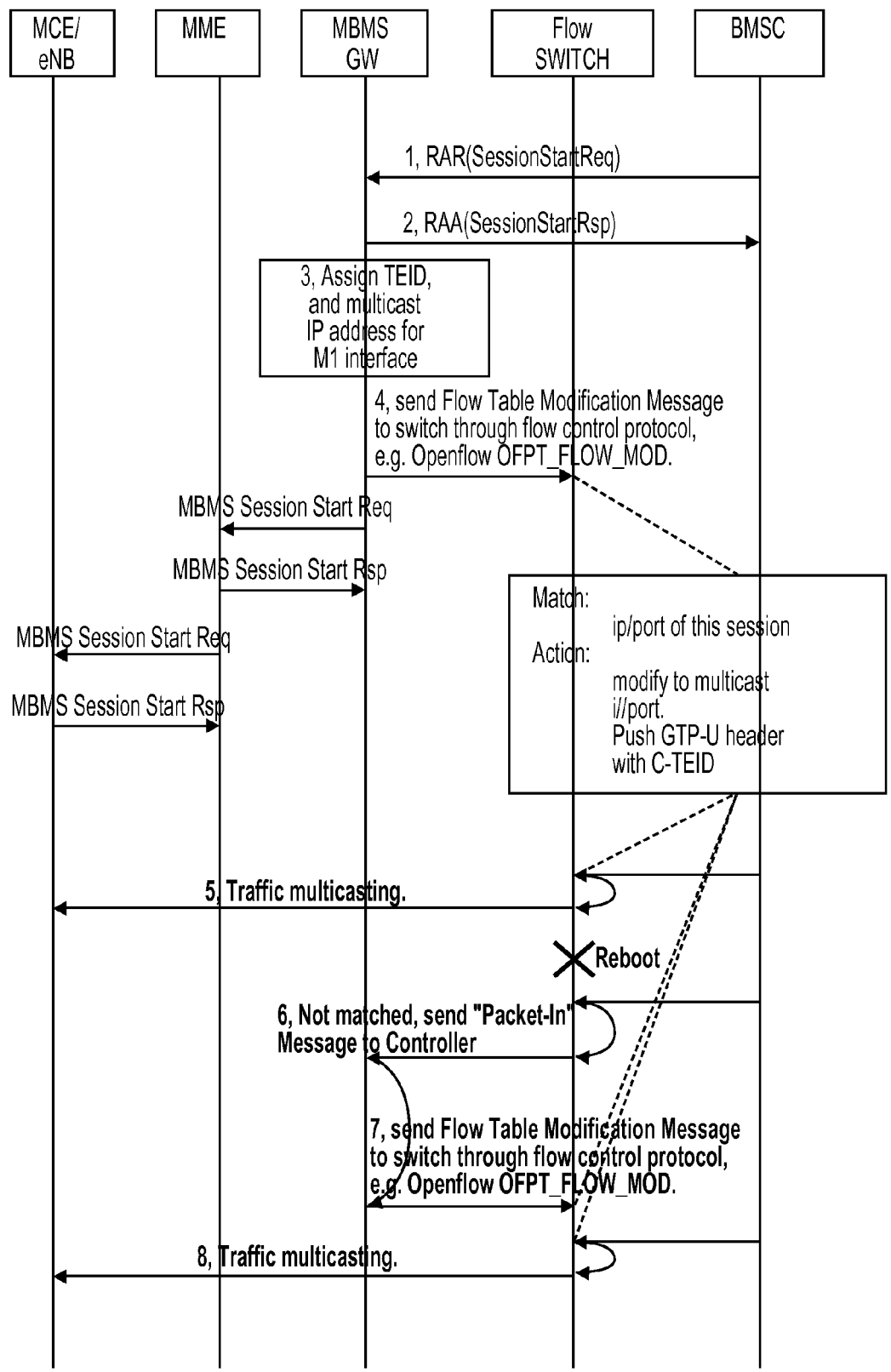
FIG. 7 is a diagram of one embodiment of the process for establishing an MBMS session where a flow switch implements the MBMS-GW-U.

FIG. 7 is a diagram of one embodiment of the process for establishing an MBMS session where a flow switch implements the MBMS-GW-U. The process is initiated by the BM-SC to service the downstream distribution of multicast and broadcast data. (1) The BM-SC sends a Session Start Request message to MBMS-GW to indicate the impending start of the transmission of the MBMS data. (2) The MBMS-GW responds with a Session Start Response message including the requisite information for the BM-SC to send MBMS data to the MBMS-GW. The MBMS-GW provides the IP (unicast) address and UDP port, on which the MBMS-GW expects data to be received.

(3) The MBMS-GW allocates a transport network IP multicast address and a common tunnel endpoint identifier (C-TEID) for this session. The MBMS-GW creates an MBMS bearer context and stores the session attributes. (e.g., the flow switch configuration information for the flow switch that handles the MBMS data plane traffic. (4) The flow controller of the MBMS-GW will download the flow rules via the flow control protocol (e.g., The OpenFlow Protocol). If there are rules already on the flow switch then they can be updated, if not, they are inserted into the flow table designated for the MBMS traffic processing. This sequence is referred to as the 'active' process to control the MBMS flow.

(5) When packets are received by the flow switch that match the unicast IP address and UDP fields, the associated defined action of the switch is to modify the IP unicast address and UDP header to a multicast address, push a GTP-U header which contains the allocated C-TEID and then forward the multicast packets to the subscribing eNodeBs.

In a case where there is a failure, (6) after rebooting the switch, all the flow rules will be lost. Incoming traffic than cannot match the rules and will go to the MBMS-GW. (7) The MBMS-GW will then be triggered to re-download the flow rules via the flow control protocol. Traffic triggered rule downloading instead of MBMS-GW-C initiated downloading of the rules for an MBMS session is a referred to herein as a 'passive' process for configuring a flow switch. In other embodiments, the flow switches can be initially passively configured in addition to restart scenarios. This alternate configuration process is described further herein below. (8) Subsequent MBMBS session traffic which matches the flow rules will be multicasted by flow switch.

In some embodiments, the MBMS-GW-C sends a MBMS Session Start Request message to the MME to notify it of the establishment of the MBMS session with the BM-SC. The MME responds with the MBMS Session Start Response message to acknowledge the notice provided by the MBMS-GW-C. In turn, the MME sends a MBMS Session Start message to the connected eNodeBs and receives the MBMS Session Start Response message. The eNodeBs may also establish radio broadcast scheduling and notify the user equipment in some embodiments.

The flow switch must be able to establish communication with an MBMS-GW flow controller at a user-configurable, but otherwise fixed IP address, using a user-specified port. If the flow switch knows the IP address of the flow controller, the flow switch can initiates a standard transport layer security (TLS) or TCP connection to the flow controller. Traffic to and from the flow controller is not run through the flow pipeline. Therefore, the flow switch must identify incoming flow control traffic as local before checking it against the flow tables.

As indicated above, there are two alternate processes to populate the flow tables, an 'active' process and a 'passive' process. In the active process, when the MBMS-GW finishes establishing an MBMS session on SGi-mb interface, 29.061. The M1 interface is a data plane interface, which is based on GTPv1-U. For an MBMS-GW incoming payload, the MBMS-GW needs to modify the IP destination address with multicasting address and UDP port between the eNodeB and MBMS-GW as well as encapsulate the MBMS payload with a GTP-U header. To implement this, one new action including 'PUSH GTP-U Header' can be introduced to support OpenFlow enabled switch MBMS-GW Payload Forwarding.

The code can be as follows:

```
enum ofp_action_type {
    OFPAT_OUTPUT,              /* Output to switch port. */
    OFPAT_SET_VLAN_VID,        /* Set the 802.1q VLAN id. */
    OFPAT_SET_VLAN_PCP,        /* Set the 802.1q priority. */
    OFPAT_SET_DL_SRC,          /* Ethernet source address. */
    OFPAT_SET_DL_DST,          /* Ethernet destination address. */
    OFPAT_SET_NW_SRC,          /* IP source address. */
    OFPAT_SET_NW_DST,          /* IP destination address. */
    OFPAT_SET_NW_TOS,          /* IP TOS (DSCP field, 6 bits). */
    OFPAT_SET_NW_ECN,          /* IP ECN (2 bits). */
    OFPAT_SET_TP_SRC,          /* TCP/UDP/SCTP source port. */
    OFPAT_SET_TP_DST,          /* TCP/UDP/SCTP destination port. */
    OFPAT_COPY_TTL_OUT,        /* Copy TTL "outwards" -- from next-to-outermost to
                                  outermost */
    OFPAT_COPY_TTL_IN,         /* Copy TTL "inwards" -- from outermost to
                                  next-to-outermost */
    OFPAT_SET_MPLS_LABEL,      /* MPLS label */
    OFPAT_SET_MPLS_TC,         /* MPLS TC */
    OFPAT_SET_MPLS_TTL,        /* MPLS TTL */
    OFPAT_DEC_MPLS_TTL,        /* Decrement MPLS TTL */
    OFPAT_PUSH_VLAN,           /* Push a new VLAN tag */
    OFPAT_POP_VLAN,            /* Pop the outer VLAN tag */
    OFPAT_PUSH_MPLS,           /* Push a new MPLS tag */
    OFPAT_POP_MPLS,            /* Pop the outer MPLS tag */
    OFPAT_SET_QUEUE,           /* Set queue id when outputting to a port */
    OFPAT_GROUP,               /* Apply group. */
    OFPAT_SET_NW_TTL,          /* IP TTL. */
    OFPAT_DEC_NW_TTL,          /* Decrement IP TTL. */
    OFPAT_PUSH_GTPU_HEADER,    /* Push a new GTP-U header */
    OFPAT_EXPERIMENTER = 0xffff
};
```

MBMS-GW will download the matching rule (i.e., the UDP tunnel, IP address and UDP ports) and associated action (PUSH GTP-U header with C-TEID) to the flow enabled switch actively.

With the passive process, if there's no matching flow table entry on the flow switch when a traffic packet from the SGi-mb interface arrives, then the flow switch will forward the packet to controller MBMS-GW. After finding out the context—the corresponding IP Multicasting address and C-TEID, the MBMS-GW will download the matching rules and associated action to the flow switch. The passive process and active process can be alternatively implemented in different scenarios or user configurable for each flow switch handling the data plane of the MBMS-GW. For example, the active process can be utilized by default and the passive process used where a restart or similar error occurs at the flow switch.

MBMS-GW-C may request the capabilities of a flow switch by sending a feature request over the flow control channel. The flow switch must respond with a feature reply that specifies the capabilities of the flow switch. A feature reply message which includes the MBMS-GW Payload Forwarding Offload Capability indicates the Switch is capable of offloading a MBMS-GW payload.

Example OpenFlow Action Implementation

Figure 8:
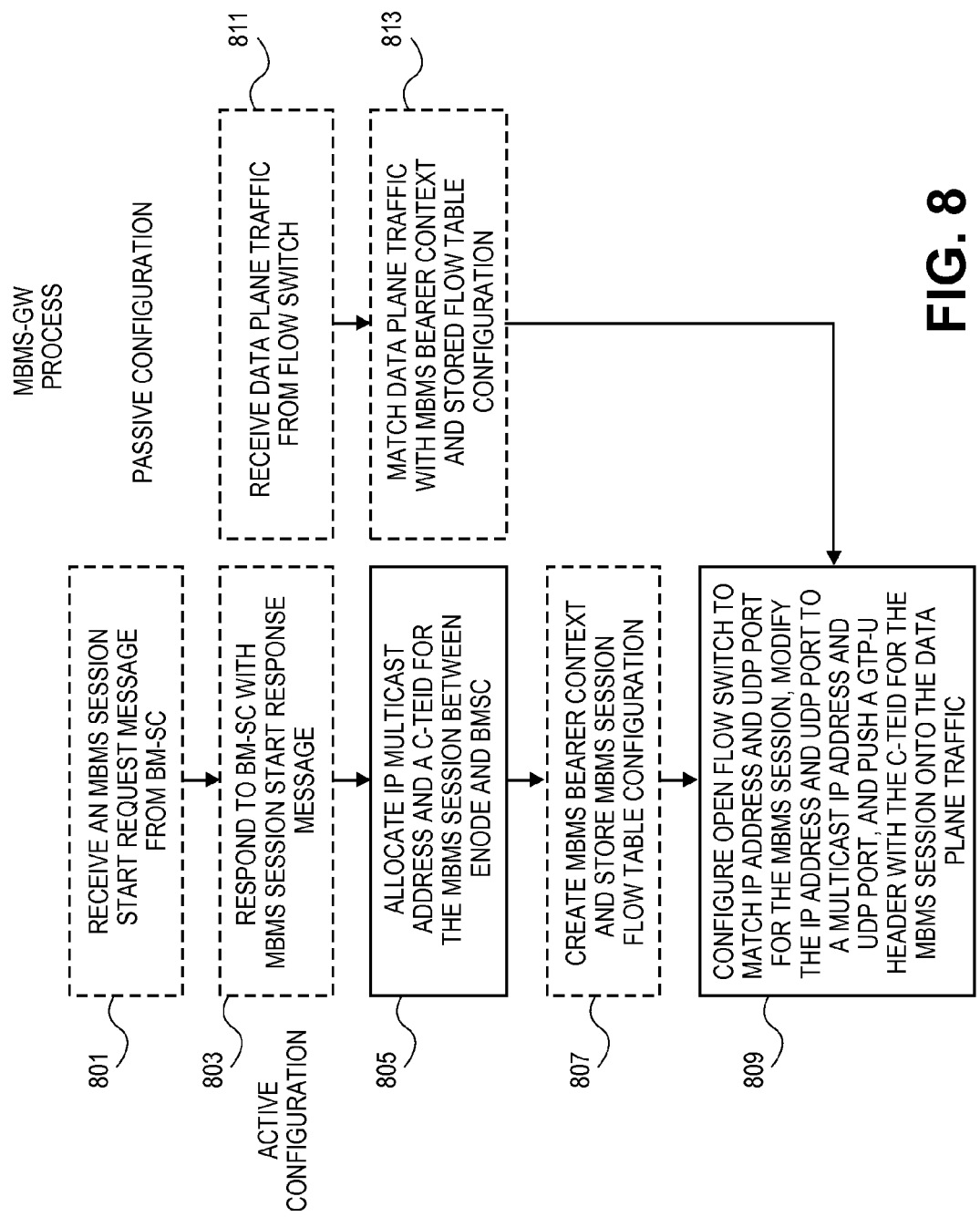
FIG. 8 is a flowchart of one embodiment of the process for establishing an MBMS session at the MBMS-GW-C.

The SGi-mb interface is a data plane interface for eMBMS traffic (downlink only) and is specified in TS FIG. 8 is a flowchart of one embodiment of the process for establishing an MBMS session at the MBMS-GW-C. In one embodiment, the process has two separate prongs, an active process and a passive process. In the active process, the MBMS-GW-C receives an MBMS Session Start Request message from the BM-SC over the SGi-mb interface (Block 801). The MBMS Session Start Request message can include an MBMS session identifier and similar information. The MBMS-GW-C responds to the received message by sending a MBMS Session Start Response message to the BM-SC (Block 803). The MBMS Session Start Response message can include an IP address and port information.

The MBMS-GW-C allocates an IP multicast address and a common tunnel endpoint identifier (C-TEID) specific to the MBMS session being established between the BM-SC and the eNodeBs (Block 805). The allocated IP multicast address and C-TEID for the MBMS session can be stored as the MBMS bearer context along with MBMS session flow table configuration information generated for the configuration of the MBMS-GW-U flow switch (Block 807). The MBMS-GW-C then configures the flow switch implementing the MBMS-GW-U with the flow table configuration information that specifies the IP address and UDP port matching information for the MBMS session and the action associated with the matching field that modifies the IP address and UDP port to the multicast IP address and UDP port as well as the pushing of the GTP-U header including the C-TEID onto the data plane traffic of the MBMS session (Block 809).

In scenarios where a passive configuration is applicable, the process can be initiated at the MBMS-GW-C in response to receiving data plane traffic from the flow switch (Block 811). The flow switch will send the data plane traffic to the MBMS-GW-C in cases where there are no matching flow table entries for the MBMS session data plane traffic. The MBMS-GW-C will then match the received data plane traffic with the MBMS bearer context and the stored flow table configuration that was previously established for the MBMS session (Block 813). The process then configures the flow switch implementing the MBMS-GW-U with the matching flow table configuration information that specifies the IP address and UDP port matching information for the MBMS session and the action associated with the matching field that modifies the IP address and UDP port to the multicast IP address and UDP port as well as the pushing of the GTP-U header including the C-TEID onto the data plane traffic of the MBMS session (Block 809)

Figure 9:
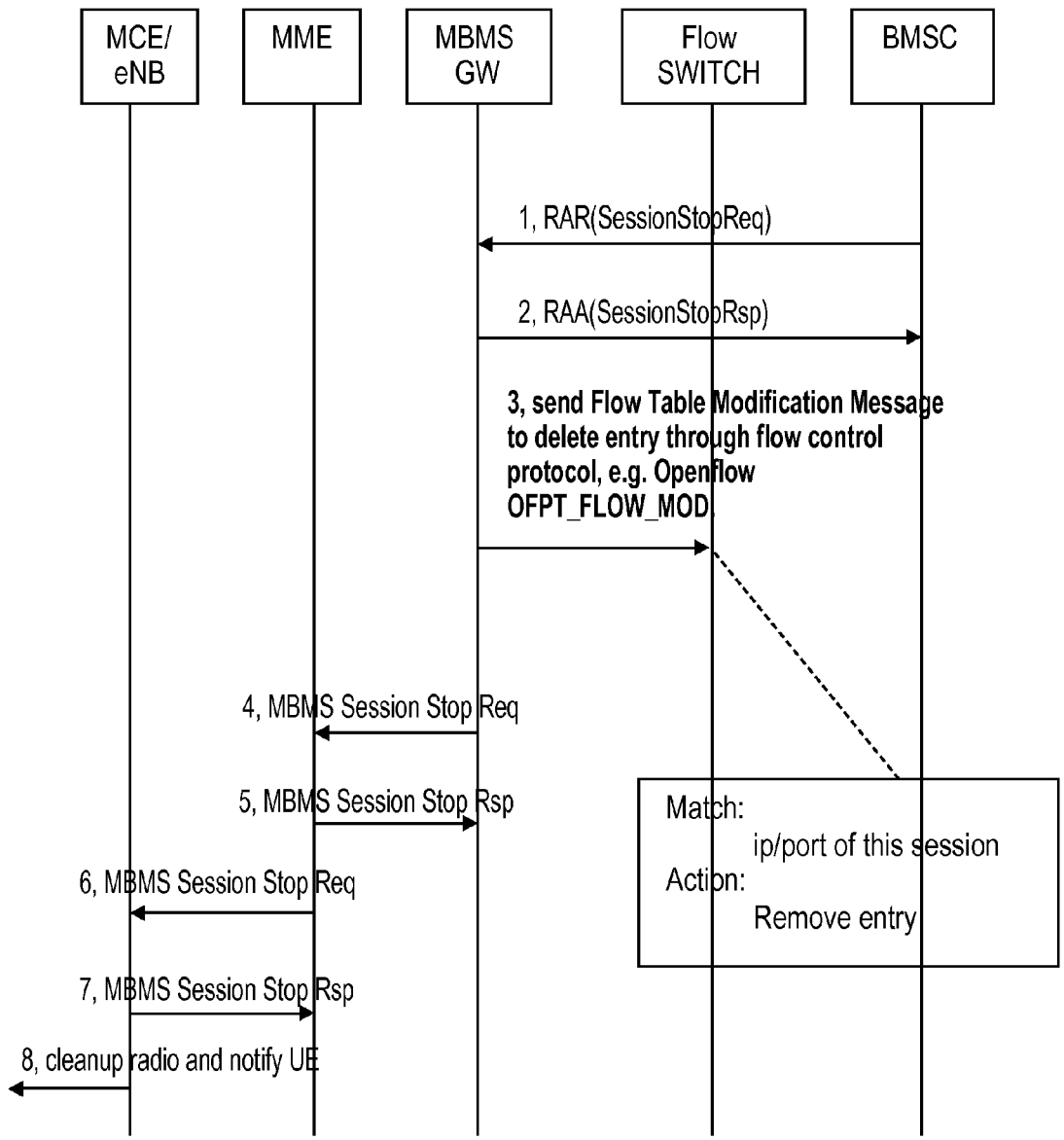
FIG. 9 is a diagram of one embodiment of the process for stopping an MBMS session where a flow switch implements the MBMS-GW-U.

FIG. 9 is a diagram of one embodiment of the process for stopping an MBMS session where a flow switch implements the MBMS-GW-U. The process is initiated by the BM-SC to stop a downstream distribution of multicast and broadcast data. The BM_SC can determine to stop an MBMS session based on a configured stop time where it sends an indicator of this to the CDN. Then, (1) the BM-SC sends a Session Stop Request message to MBMS-GW over the SGmb interface to indicate the impending halt of the transmission of the MBMS session data. (2) The MBMS-GW responds with a Session Stop Response message (3) The flow controller of the MBMS-GW will reconfigure the flow rules of the flow switch implementing the MBMS-GW data plane via the flow control protocol (e.g., The OpenFlow Protocol). (4) The MBMS-GW-C then sends a MBMS Session Stop Request message to the MME to notify it of the ending of the MBMS session with the BM-SC. (5) The MME responds with the MBMS Session Stop response message to acknowledge the notice provided by the MBMS-GW-C. In turn, (6) the MME sends a MBMS Session Stop message to the connected eNodeBs and (7) receives the MBMS Session Stop Response message. (8) The eNodeBs may also cleanup radio broadcast scheduling and notify the user equipment in some embodiments.

Figure 10:
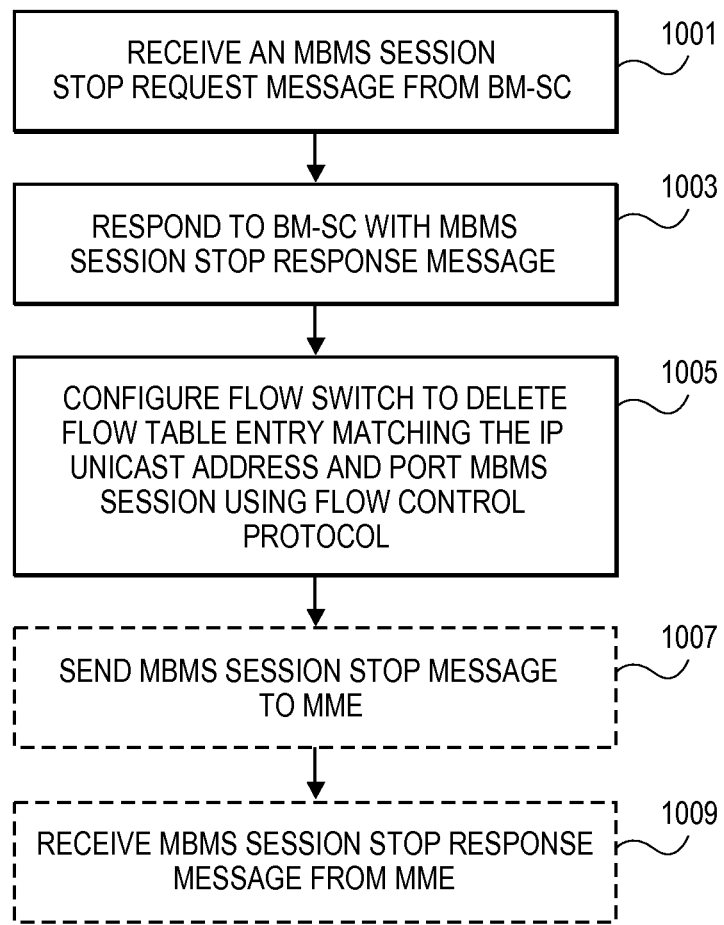
FIG. 10 is a flowchart of one embodiment of the process for stopping an MBMS session at the MBMS-GW-C.

FIG. 10 is a flowchart of one embodiment of the process for stopping an MBMS session at the MBMS-GW-C. In one embodiment, the MBMS-GW-C receives an MBMS Session Stop Request message from the BM-SC over the SGi-mb interface (Block 1001). The MBMS Session Stop Request message can include the MBMS session identifier and similar information. The MBMS-GW-C responds to the received message by sending an MBMS Session Stop response message to the BM-SC (Block 1003).

The MBMS-GW-C then configures the flow switch implementing the MBMS-GW-U by removing the flow table configuration information that specifies the unicast IP address and UDP port matching information for the MBMS session and the action associated with the matching field that modifies the IP address and UDP port to the multicast IP address and UDP port as well as the pushing of the GTP-U header including the C-TEID onto the data plane traffic of the MBMS session (Block 1005).

The MBMS-GW-C can then promulgate the ending of the MBMS session downstream by sending an MBMS Session Stop message to the MME (Block 1007). The MME will respond with an MBMS Session Stop Response message (Block 1009). The MBMS-GW-C can then remove any MBMS session data and flow control configuration from its storage.

Figure 11:
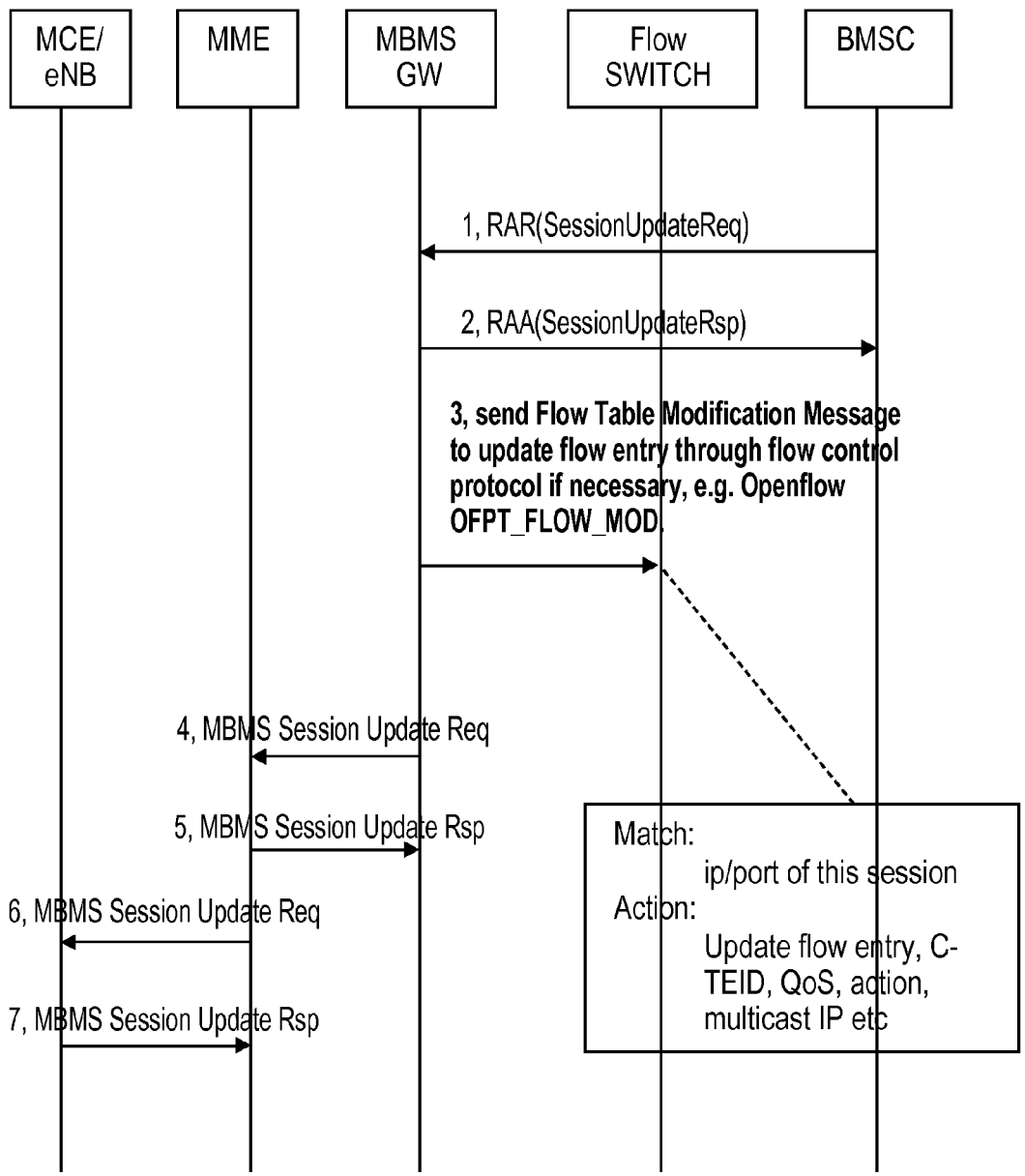
FIG. 11 is a diagram of one embodiment of the process for updating an MBMS session where a flow switch implements the MBMS-GW-U.

FIG. 11 is a diagram of one embodiment of the process for updating an MBMS session where a flow switch implements the MBMS-GW-U. The process is initiated by the BM-SC to update a downstream distribution of multicast and broadcast data. The BM_SC can determine to update an MBMS session based on any change received from the CDN or under similar conditions. Then, (1) the BM-SC sends a Session Update Request message to MBMS-GW over the SGmb interface to indicate the impending change in the transmission of the MBMS session data. (2) The MBMS-GW responds with a Session Update Response message (3) The flow controller of the MBMS-GW will reconfigure the flow rules of the flow switch implementing the MBMS-GW data plane via the flow control protocol (e.g., The OpenFlow Protocol). (4) The MBMS-GW-C then sends an MBMS Session Update Request message to the MME to notify it of the changes to the MBMS session with the BM-SC. (5) The MME responds with the MBMS Session Update Response message to acknowledge the notice provided by the MBMS-GW-C. In turn, (6) the MME sends an MBMS Session Update message to the connected eNodeBs and (7) receives the MBMS Session Update Response message. The eNodeBs may also adjust radio broadcast scheduling and notify the user equipment in some embodiments.

Figure 12:
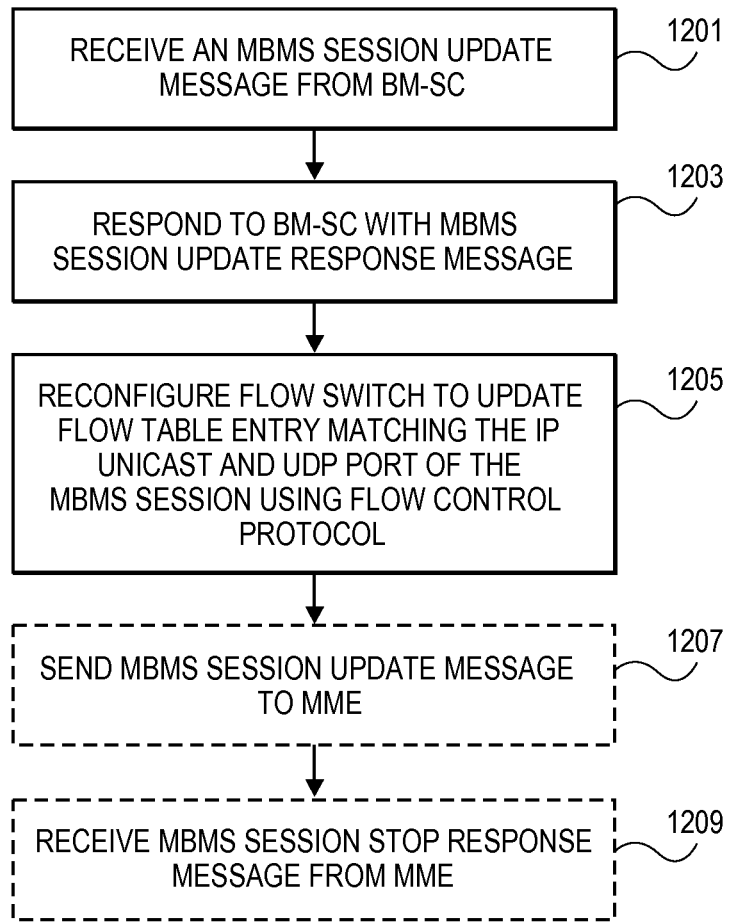
FIG. 12 is a flowchart of one embodiment of the process for updating an MBMS session at the MBMS-GW-C.

FIG. 12 is a flowchart of one embodiment of the process for updating an MBMS session at the MBMS-GW-C. In one embodiment, the MBMS-GW-C receives an MBMS Session Update Request message from the BM-SC over the SGi-mb interface (Block 1201). The MBMS Session Update Request message can include the MBMS session identifier and similar information. The MBMS-GW-C responds to the received message by sending an MBMS Session Update Response message to the BM-SC (Block 1203).

The MBMS-GW-C then configures the flow switch implementing the MBMS-GW-U by modifying the flow table configuration information that specifies the unicast IP address and UDP port matching information for the MBMS session and the action associated with the matching field that modifies the IP address and UDP port to the multicast IP address and UDP port as well as the pushing of the GTP-U header including the C-TEID onto the data plane traffic of the MBMS session (Block 1205).

The MBMS-GW-C can then promulgate the changes to the MBMS session downstream by sending an MBMS Session Update message to the MME (Block 1207). The MME will respond with an MBMS Session Update Response message (Block 1209). The MBMS-GW-C can then update any MBMS session data and flow control configuration in its storage.

Alternate Implementations

In other embodiments, the split EPC architecture can be implemented in non-cloud and non-virtualized systems. The control plane entities of the EPC architecture can be stored and executed on a single server or distributed across any number of servers or similar computing devices. Similarly, the control plane entities can be executed as standard software code and modules without virtualization or similar systems. These control plane entities can communicate with one another through local system or procedure calls, remote procedure calls or similar mechanisms. In further embodiments, a subset of the control plane entities can be virtualized or executed in a cloud computing system while another subset of the control plane entities can be executed in a server, distributed server system or similar system. The control plane entities can communicate with the data plane through the use of the OpenFlow protocol as described herein above or through other control protocols as described herein below.

The cloud computing system described herein above is provided by way of example and not by way of limitation. One skilled in the art would understand that the principles and features described above in relation to the cloud computing system can also be implemented in other configurations such as single servers or distributed server systems. Similar principles and features to those described above can be implemented in single server systems, distributed server systems and similar computing environments. These principles and features can also be implemented using a non-virtualized environment including non-virtualized control plane entities that are executed in any combination of cloud computing systems, single servers, distributed server systems and similar systems.

In other embodiments, other control protocols can be utilized in place of OpenFlow as described herein. The use of OpenFlow is presented by way of example and not limitation. Other control protocols can also be utilized to manage the communication between the control plane and data plane and configuration of the data plane of the split EPC architecture. An example of such a protocol is FORCES, an IETF standard protocol for splitting the control plane and forwarding plane in networks. The FORCES protocol specification is described in RFC 5810. RFC 5812 describes the architecture of a FORCES forwarding element, the equivalent of an OpenFlow switch. The FORCES protocol itself does not directly support programming routes into the forwarding element, it is, instead, a framework for handling the interaction between the FORCES controller and a FORCES forwarding element. The forwarding element architecture describes how to design the protocol that actually allows a FORCES controller to program a FORCES forwarding element. One skilled in the art would understand that a FORCES based system could include features described herein above in relation to the OpenFlow embodiment, such as the GTP OpenFlow extension, to allow the controller to program the switches for GTP TEID routing.

FORCES and OpenFlow are provided by way of example and not limitation. One skilled in the art would understand that the principles and features described above in relation to the FORCES and OpenFlow protocols can also be implemented in other similar control protocols.

Thus, a method, system and apparatus for implementing an MBMS in a cloud computing system has been described. The embodiments make MBMS-GW data plane handling more flexible and agile. The data plane is completely separated to a flow switch and the high level control decisions are kept in the MBMS-GW-C node (e.g., in a cloud computing system). The embodiments provide a new method to offload MBMS-GW traffic over SGi-mb, M1 interface, enabling management of scalable and agile data plane. There is no impact to current telecommunication node architecture and functionality.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a network element implementing a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB), the method comprising:
  allocating an IP multicast address and a common tunnel endpoint identifier (C-TEID) for an MBMS session between the eNodeB and a broadcast multicast service center (BM-SC); and
  configuring a flow switch of the at least one network element via a flow control protocol, wherein the flow switch of the at least one network element is configured to:
    i) match an IP address and a user datagram protocol (UDP) port of incoming data plane traffic,
    ii) modify the IP address and UDP port to the IP multicast address and associated UDP port, and
    iii) push a general packed radio service (GPRS) tunneling protocol (GTP) user data (GTP-U) header including the C-TEID for the MBMS session onto the data plane traffic.

2. The method of claim 1, further comprising:
  creating an MBMS bearer context; and
  storing MBMS session attributes.

3. The method of claim 2, wherein the method is a passive configuration process and before the configuring further comprises:
  receiving data plane traffic from the at least one network element; and
  matching the data plane traffic with the MBMS bearer context or MBMS session attributes.

4. The method of claim 1, further comprising:
  receiving an MBMS session start request message from the BM-SC; and
  responding to the BM-SC with a MBMS session start response message.

5. The method of claim 4, wherein the method is an active configuration process that performs the configuring of the at least one network element after the responding to the BM-SC with the MBMS session start response message.

6. The method of claim 1, wherein the flow switch is an Openflow Switch and the flow control protocol is an Openflow protocol.

7. The method of claim 1, further comprising:
  sending the MBMS session start request message to a mobility management entity (MME); and
  receiving the MBMS session start response message from the MME.

8. The method of claim 1, wherein the configuring downloads a match field and action set, which constructs a flow entry, for a flow table in a flow switch.

9. A network element implementing a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB), the network element comprising:
  a receiver configured to receive the data traffic;
  a transmitter configured to transmit the data traffic; and
  a computing processor configured to execute an MBMS module and an MBMS controller module,
  the MBMS module configured to allocate an IP multicast address and a control tunnel endpoint identifier (C-TEID) for an MBMS session between the eNodeB and a broadcast multicast service center (BM-SC); and the MBMS controller module configured to configure a flow switch of the at least one network element via a flow control protocol, wherein the flow switch of the at least one network element is configured to:
i) match an IP address and a user datagram protocol (UDP) port of incoming data plane traffic,
ii) modify the IP address to the IP multicast address and associated UDP port, and
iii) push a general packed radio service (GPRS) tunneling protocol (GTP) user data (GTP-U) header including the C-TEID onto the data plane traffic.

10. The network element of claim 9, wherein the MBMS module is further configured to create an MBMS bearer context and store MBMS session attributes.

11. The network element of claim 10, wherein the MBMS controller module implements a passive configuration process and before the configuring, the MBMS module is further configured to receive data plane traffic from the at least one network element and to match the data plane traffic with the MBMS bearer context or MBMS session attributes.

12. The network element of claim 9, wherein the MBMS module is further configured to receive an MBMS session start request message from the BM-SC and to respond to the BM-SC with a MBMS session start response message.

13. The network element method of claim 12, wherein the MBMS controller module implements an active configuration process that performs the configuring of the at least one network element after the responding to the BM-SC with the MBMS session start response message.

14. The network element of claim 9, wherein the flow switch is an OpenFlow switch and the flow control protocol is an OpenFlow protocol.

15. The network element of claim 9, wherein the MBMS module is further configured to send the MBMS session start request message to a mobility management entity (MME) and to receive the MBMS session start response message from the MME.

16. The network element of claim 9, wherein the MBMS controller module downloads a match field and an action set for a flow table in a flow switch.

17. The network element of claim 9, wherein the network element is implemented in a cloud computing system.

18. A method executed by a network element implementing a multimedia broadcast multicast services gateway (MBMS-GW) to offload data plane traffic to at least one network element, where the data plane traffic is enhanced MBMS (eMBMS) downlink traffic for a data plane interface Internet Protocol (IP) multicast transport between the MBMS-GW and an enhanced node B (eNodeB), the method comprising:
receiving an MBMS session stop request message from a broadcast multicast service center (BM-SC);
sending an MBMS session stop response message to the BM-SC; and
configuring a flow switch of the at least one network element via a flow control protocol, wherein the flow switch of the at least one network element is configured to delete a flow table entry matching an IP address and a user datagram protocol (UDP) port of incoming data plane traffic for the MBMS session using the flow control protocol.

* * * * *